US012808498B1

(12) United States Patent
Ouyang

(10) Patent No.: US 12,808,498 B1
(45) Date of Patent: *Nov. 24, 2026

(54) MODULAR FLOOR LAMP

(71) Applicant: Xiaoling Ouyang, Dongguan City (CN)

(72) Inventor: Xiaoling Ouyang, Dongguan City (CN)

( * ) Notice: Subject to any disclaimer, the term of this patent is extended or adjusted under 35 U.S.C. 154(b) by 1 day.

This patent is subject to a terminal disclaimer.

(21) Appl. No.: 19/463,446

(22) Filed: Jan. 29, 2026

Related U.S. Application Data

(63) Continuation of application No. 19/346,443, filed on Sep. 30, 2025.

(51) Int. Cl.
*F21S 2/00* (2016.01)
*F21S 4/26* (2016.01)
*F21S 6/00* (2006.01)

(52) U.S. Cl.
CPC ................. *F21S 2/005* (2013.01); *F21S 4/26* (2016.01); *F21S 6/004* (2013.01)

(58) Field of Classification Search
CPC .... F21S 2/005; F21S 4/26; F21S 6/004; F21S 6/00; F21S 6/005; F21S 6/008; F21V 5/04; F21V 21/06; F21V 23/004
See application file for complete search history.

(56) References Cited

U.S. PATENT DOCUMENTS 6,357,896 B1 * 3/2002 Yeh ........................... F16B 7/20 362/410
6,361,186 B1 * 3/2002 Slayden ................ F21V 3/0625 362/240
12,259,114 B1 * 3/2025 Wang ...................... F21S 6/005
2010/0053951 A1 * 3/2010 Hsieh ...................... F21S 6/007 362/235

* cited by examiner

*Primary Examiner* — Bao Q Truong

(57) ABSTRACT

A modular floor lamp includes a supporting member and a light-emitting device connected to the supporting member. The supporting member includes at least one first supporting member and at least one second supporting member. The modular floor lamp further includes a first insertion column. The first supporting member and the second supporting member are detachably connected via the first insertion column.

16 Claims, 10 Drawing Sheets

MODULAR FLOOR LAMP

CROSS-REFERENCE TO RELATED APPLICATIONS

This application is a continuation application of U.S. application Ser. No. 19/346,443, field on Sep. 30, 2025, the content of which is incorporated by reference herein.

TECHNICAL FIELD

The present disclosure relates to the field of lighting devices, in particular to a modular floor lamp.

BACKGROUND

In modern lighting design, floor lamps are widely popular due to their flexible design and versatility. Traditional floor lamps usually adopt a fixed structure. Although they can provide basic lighting functions, there are certain limitations in adjusting the light direction and light distribution. Meanwhile, the disassembly, assembly, and maintenance processes of the traditional floor lamps are relatively cumbersome. Therefore, users often need to spend a lot of time and effort when replacing light bulbs or performing repairs.

To overcome the above drawbacks, the design of modular floor lamps has emerged. The modular floor lamp, through modular design, enables each component of the lamp to be easily disassembled and assembled. However, most of the modular floor lamps currently on the market have uneven light distribution and are unable to provide a soft lighting effect.

Therefore, the present disclosure provides a brand-new modular floor lamp. The floor lamp has a more uniform and softer lighting effect, reduces light spots and shadows, and improves the light quality and visual comfort. Moreover, the floor lamp of the present disclosure adopts a modular structure, allowing users to disassemble or assemble it as needed. Furthermore, this floor lamp occupies less space during transportation, handling, and storage, which can reduce logistics and transportation costs and enhance portability.

SUMMARY

In order to overcome the shortcomings of the prior art, the present disclosure provides a modular floor lamp. The floor lamp has a more uniform and softer lighting effect, reduces light spots and shadows, and improves the light quality and visual comfort.

The technical solution adopted by the present disclosure to solve the technical problems is as follows.

The present disclosure provides a modular floor lamp. The modular floor lamp includes a supporting member and a light-emitting device connected to the supporting member. The supporting member comprises at least one first supporting member and at least one second supporting member. The modular floor lamp further includes a first insertion column. The first supporting member and the second supporting member are detachably connected via the first insertion column.

As an improvement of the present disclosure, the first supporting member and the second supporting member respectively have a hollow cylindrical structure. The first supporting member and the second supporting member are respectively provided with a first partition plate. The first partition plate is configured for dividing an internal space of the first supporting member and an internal space of the second supporting member into a first accommodating space and a second accommodating space respectively. The light-emitting device is detachably mounted in the first accommodating space. In addition, an outer side wall of the light-emitting device abuts against an inner side wall of the first accommodating space.

As an improvement of the present disclosure, each of two ends of the second accommodating space is respectively provided with a first insertion hole. The first insertion column is inserted into the first insertion hole, so that the first supporting member and the second supporting member are detachably connected.

As an improvement of the present disclosure, each of two ends of the first partition plate is respectively provided with at least one fixing hole, and a fastening member is arranged in the fixing hole. When the first insertion column is inserted into the first insertion hole, the fastening member abuts against the first insertion column, so that the first insertion column is fixed in the first insertion hole.

As an improvement of the present disclosure, one side of the first partition plate facing the second accommodating space is provided with a first groove and a second groove. One side of the first insertion column is provided with a first protruding rib and a second protruding rib. when the first insertion column of the first supporting member is inserted into the first insertion hole of the second supporting member, the first protruding rib is engaged with the first groove, and the second protruding rib is engaged with the second groove.

As an improvement of the present disclosure, the first supporting member and the second supporting member are respectively provided with a mounting opening. In addition, the mounting opening is in communication with the first accommodating space, so that the lamp body is detachably mounted in the first accommodating space through the mounting opening.

As an improvement of the present disclosure, the light-emitting device is a flexible light-emitting device, and the flexible light-emitting device includes a light-transmitting lamp body and a light-emitting element. The lamp body is provided with at least one mounting cavity, and the light-emitting element is detachably arranged in the mounting cavity. The lamp body is further provided with at least one cavity, and the cavity is arranged parallel to the mounting cavity. The light from the light-emitting element enters the cavity and is refracted and mixed in the cavity.

As an improvement of the present disclosure, each of two side walls of the first accommodating space is provided with a mounting clip respectively. In addition, each of two side walls of the lamp body is respectively provided with a mounting groove corresponding to the mounting clip. The mounting clip is engaged in the mounting groove, so that the lamp body is detachably connected to the first accommodating space.

As an improvement of the present disclosure, the lamp body is a flexible light-transmitting hose. The light-emitting element includes a flexible light panel and a plurality of light beads electrically connected to the flexible light panel. The light-emitting element is configured to bend along with the lamp body at any angle.

As an improvement of the present disclosure, each of two ends of the lamp body is provided with an opening respectively. In addition, the opening is in communication with the cavity, so that the light-emitting element is detachably mounted in the mounting cavity through the opening.

As an improvement of the present disclosure, a first sealing cover and a second sealing cover for sealing the openings are respectively arranged on both ends of the lamp body. The first sealing cover is provided with a through hole, and the through hole is in communication with the mounting cavity, so that the light-emitting element is detachably mounted in the mounting cavity. In addition, the light-emitting element extends outwards from the through hole to be electrically connected to an external power source.

As an improvement of the present disclosure, the first sealing cover and the second sealing cover are each provided with a sealing column, and the sealing column is mounted in the cavity to seal the cavity.

As an improvement of the present disclosure, the cavity is positioned at an outer side of the mounting cavity. In addition, an outer side wall of the cavity has an arc-shaped structure, so that the light from the light-emitting element enters the cavity to be refracted and mixed and then diverges outwards.

As an improvement of the present disclosure, a thickness of an outer side wall of the mounting cavity is in a range from 0.1 mm to 100 mm. A thickness of an outer side wall of the cavity is in a range from 0.2 mm to 120 mm. In addition, an accommodating space of the cavity is greater than that of the mounting cavity, so that the light is able to be fully refracted and mixed within the cavity.

As an improvement of the present disclosure, the floor lamp further includes a base, and the base is detachably connected to the supporting member. The flexible light-emitting device is detachably connected to the supporting member, and the light-emitting device is electrically connected to the base.

As an improvement of the present disclosure, the base includes a mounting base plate, and a central connecting column is arranged on the mounting base plate. The central connecting column is detachably connected to the supporting member via a second insertion column.

As an improvement of the present disclosure, each of two ends of the supporting member is respectively provided with a second insertion hole. The second insertion column is inserted into the second insertion hole, so that the base is detachably connected to the supporting member.

As an improvement of the present disclosure, the central connecting column has a hollow cylindrical structure, and a second partition plate is arranged inside the central connecting column. The second partition plate is configured for dividing an internal space of the central connecting column into a third accommodating space and a fourth accommodating space. The second insertion column is arranged in the third accommodating space, and the second insertion column abuts against an inner wall surface of the third accommodating space.

As an improvement of the present disclosure, the flexible light-emitting device is detachably mounted in the supporting member and extends into the fourth accommodating space. In addition, the light-emitting device is electrically connected to the base.

As an improvement of the present disclosure, a top end of the supporting member is provided with a cover plate configured for sealing the supporting member.

Beneficial effects of the present disclosure are as follows. The present disclosure provides a modular floor lamp. The modular floor lamp includes a supporting member and a light-emitting device connected to the supporting member. The supporting member includes at least one first supporting member and at least one second supporting member. The modular floor lamp further includes a first insertion column. The first supporting member and the second supporting member are detachably connected via the first insertion column. The flexible light-emitting device includes a light-transmitting lamp body and a light-emitting element. The lamp body is provided with at least one mounting cavity, and the light-emitting element is detachably arranged in the mounting cavity. The lamp body is further provided with at least one cavity, and the cavity is arranged parallel to the mounting cavity. The light from the light-emitting element enters the cavity and is refracted and mixed in the cavity. Through the above structure, the floor lamp of the present disclosure has a more uniform and softer lighting effect, reduces light spots and shadows, and improves the light quality and visual comfort. Moreover, this floor lamp adopts a modular structure, allowing users to disassemble or assemble it as needed. Furthermore, this floor lamp occupies less space during transportation, handling, and storage, which can reduce logistics and transportation costs and enhance portability.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
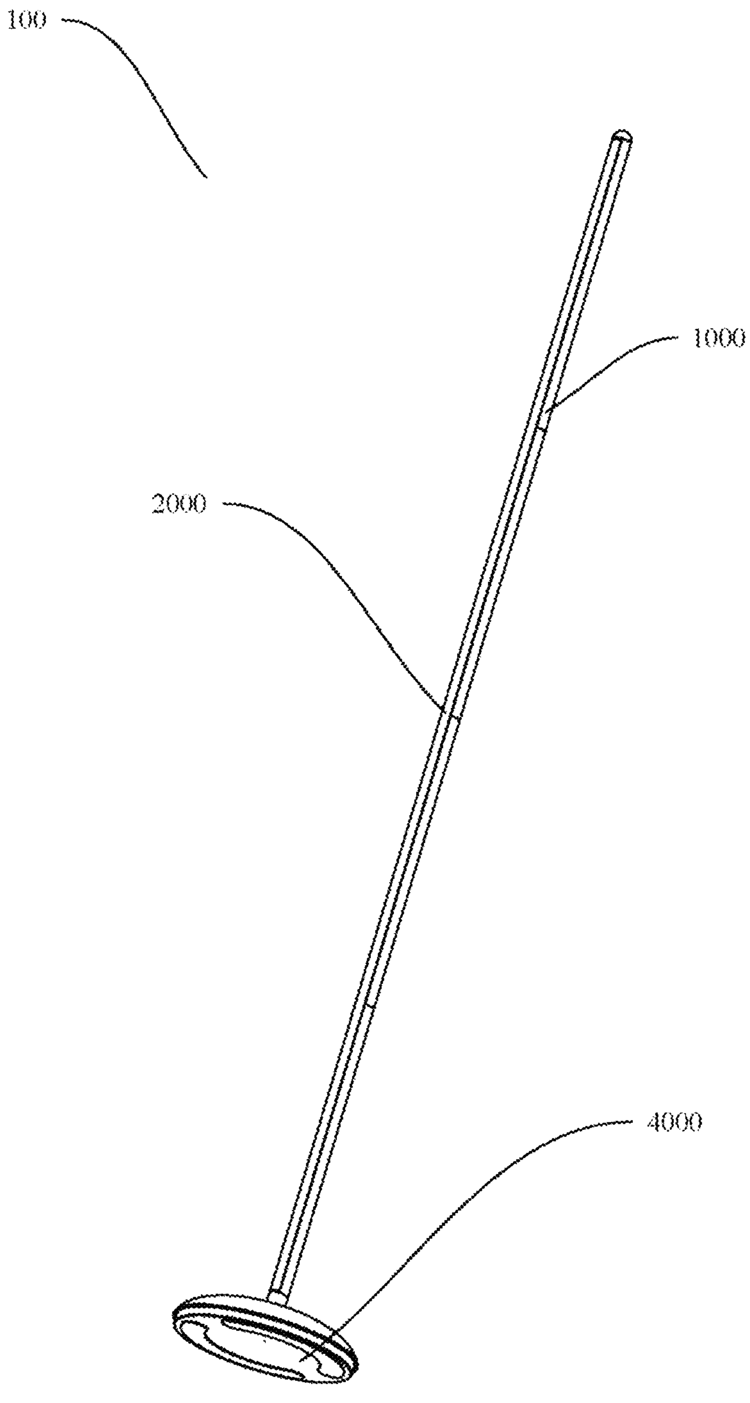
FIG. 1 is a schematic diagram of an overall structure of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
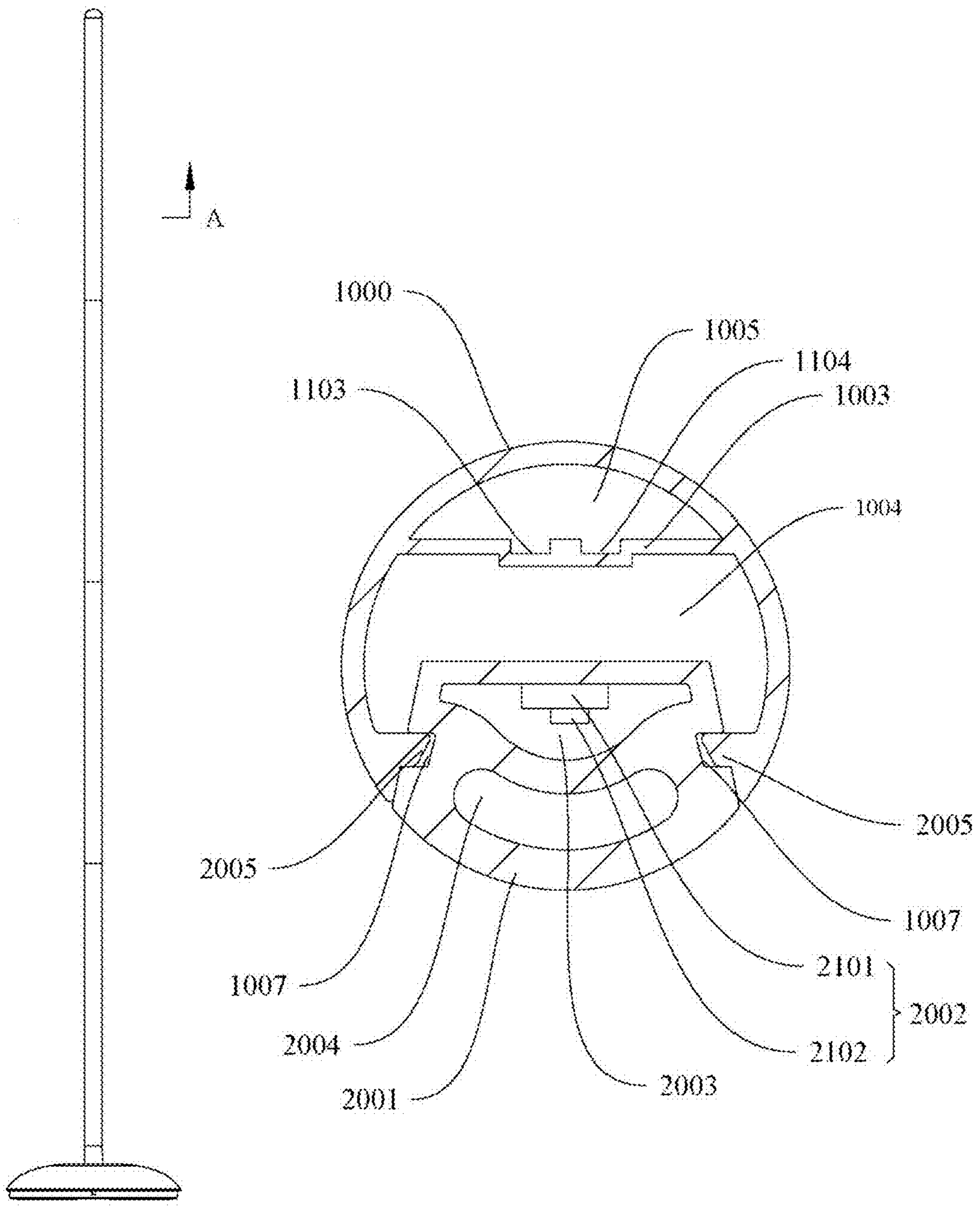
FIG. 2 is a cross-sectional structural view of an area A of the present disclosure.
Figure 3:
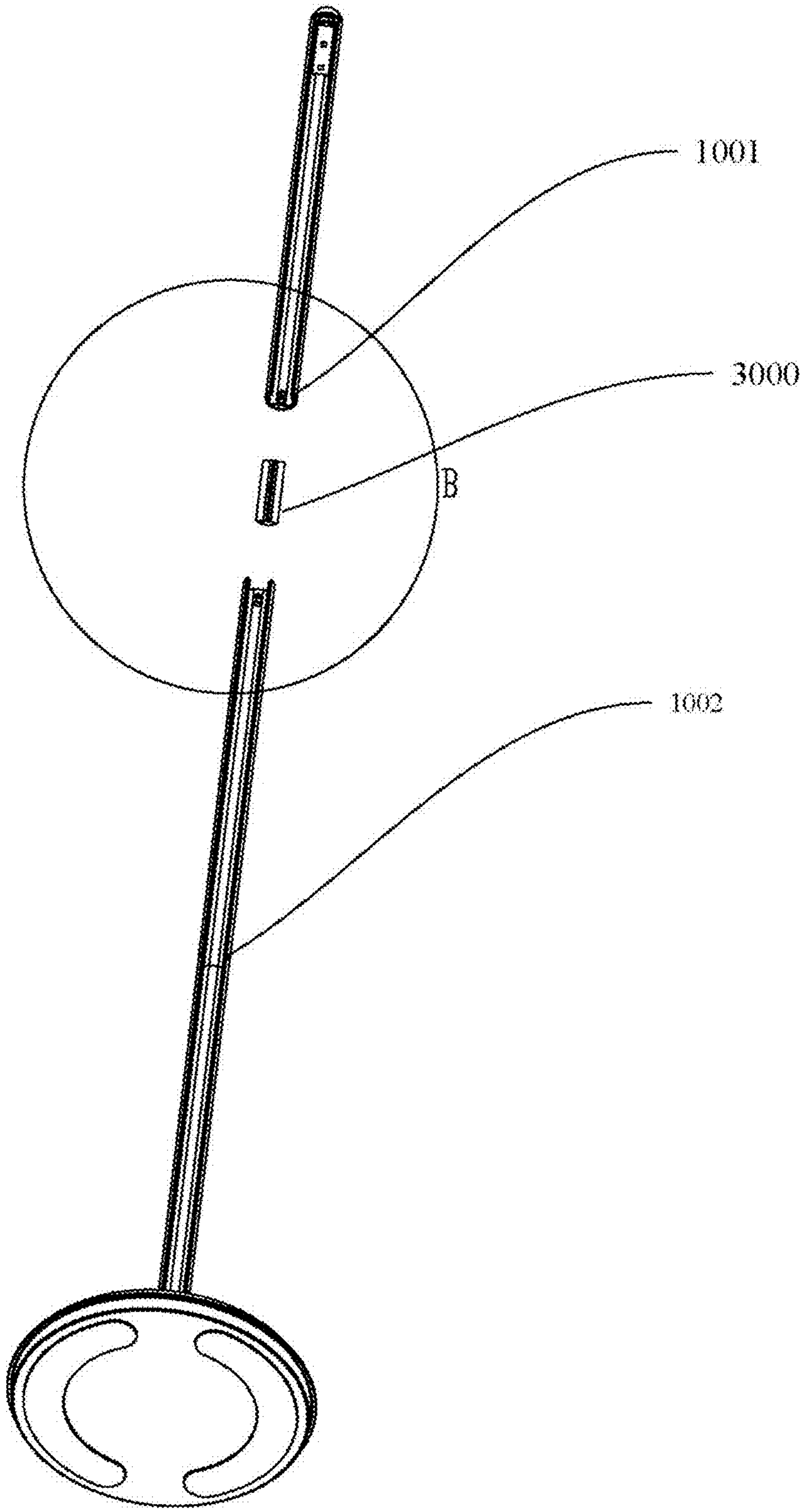
FIG. 3 is an exploded view showing the connection of a first supporting member and a second supporting member.
Figure 4:
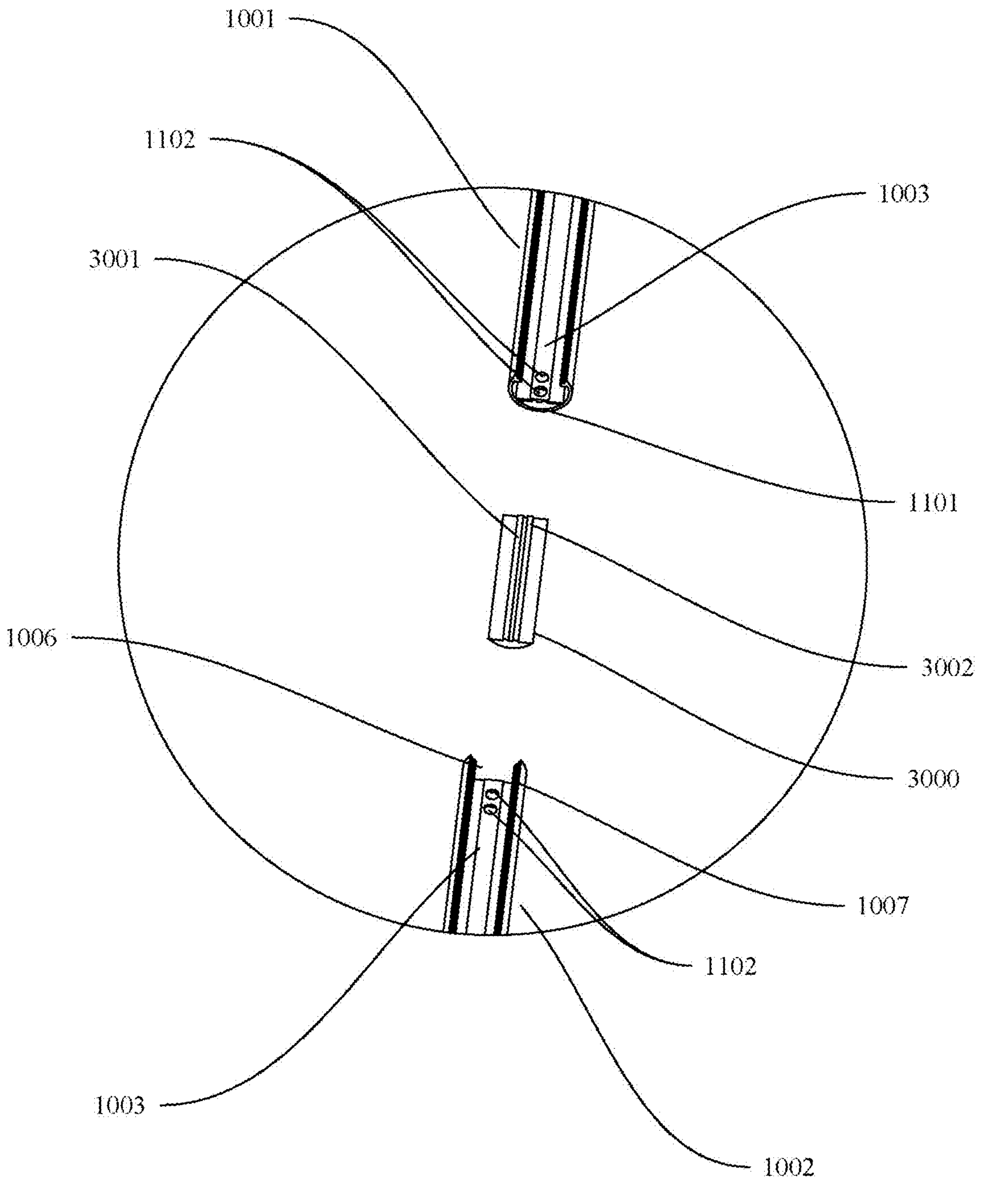
FIG. 4 is an enlarged view of an area B in FIG. 3.
Figure 5:
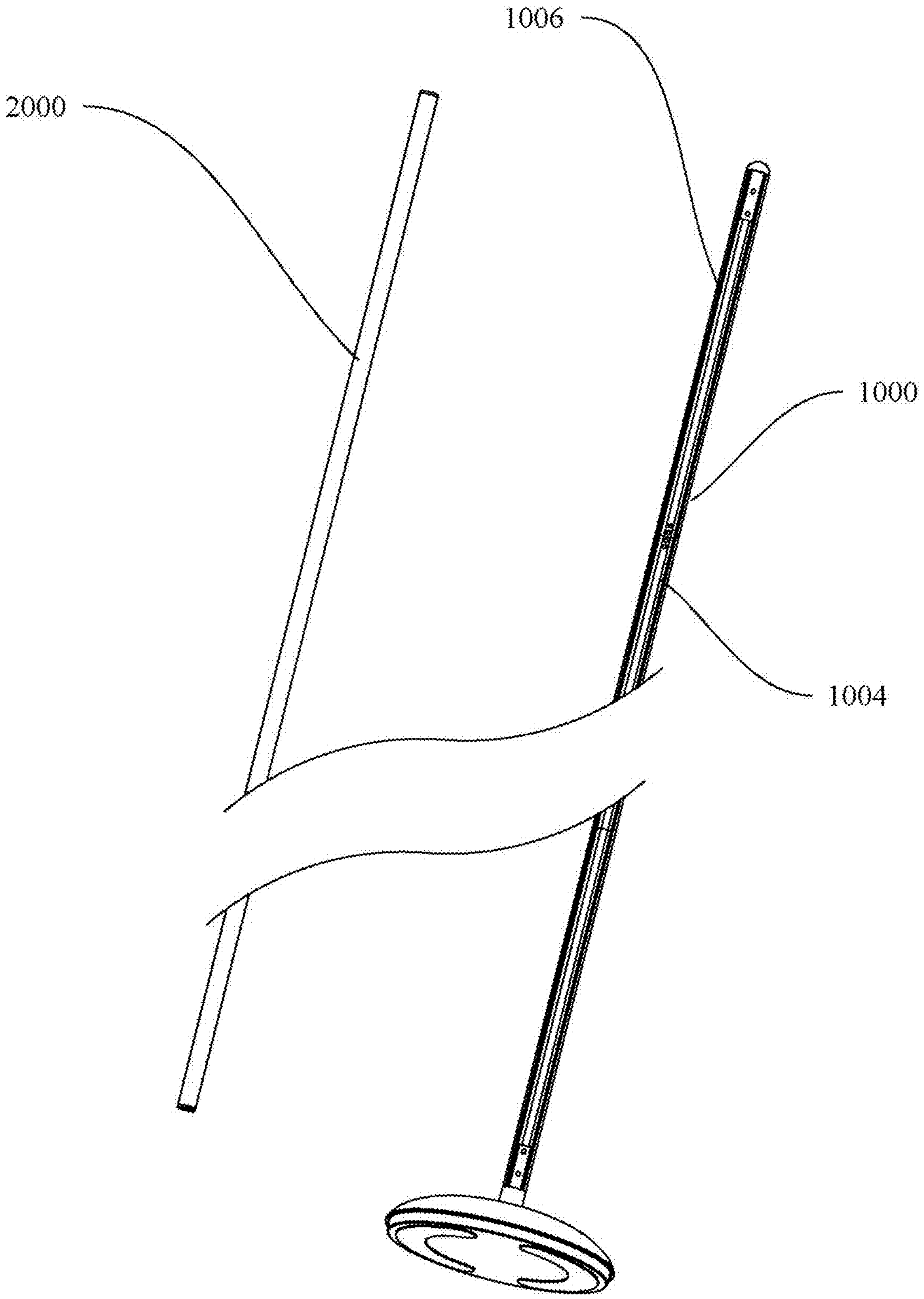
FIG. 5 is an exploded view showing the connection of a flexible light-emitting device and a supporting member.
Figure 6:
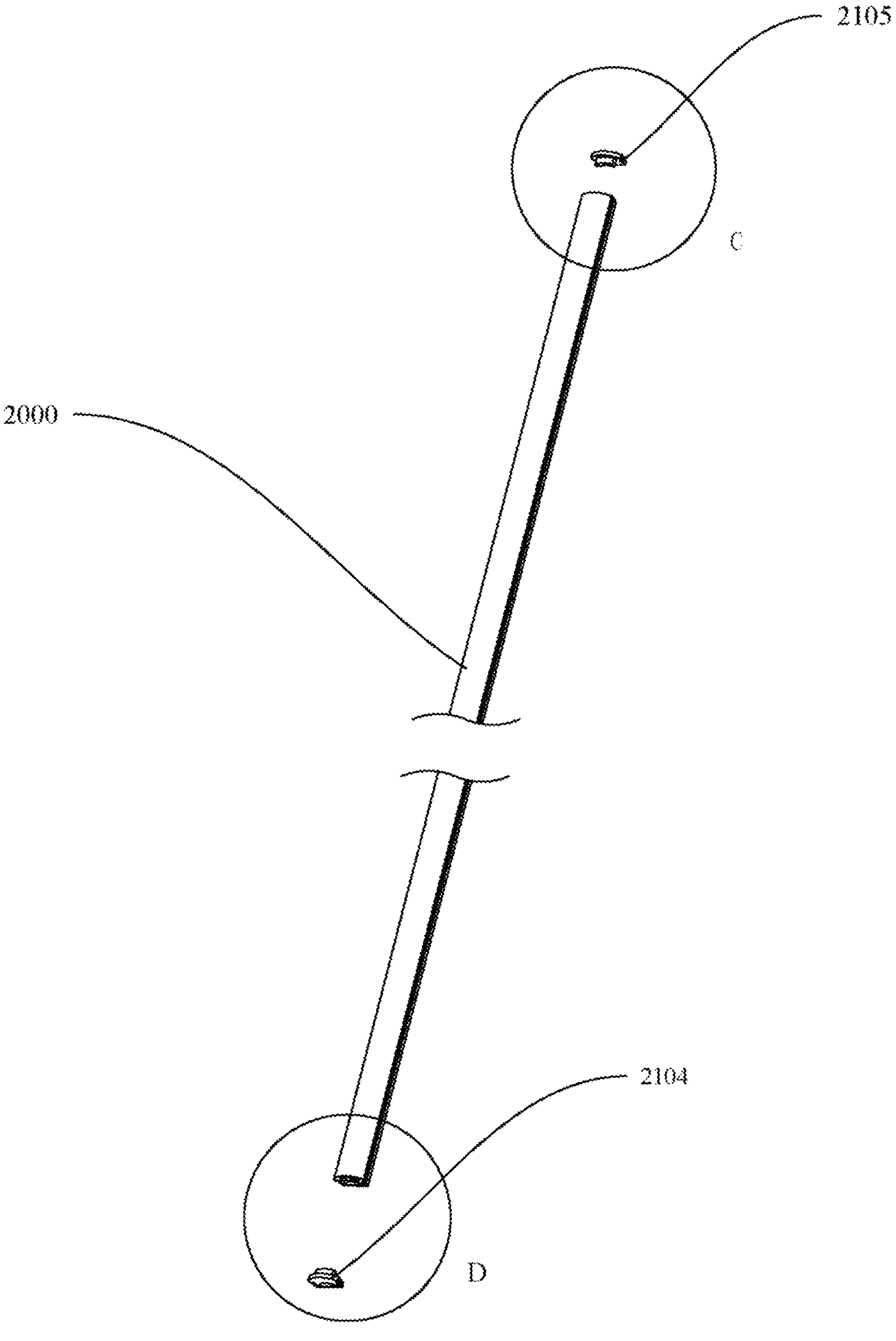
FIG. 6 is a structural diagram of the flexible light-emitting device.
Figure 7:
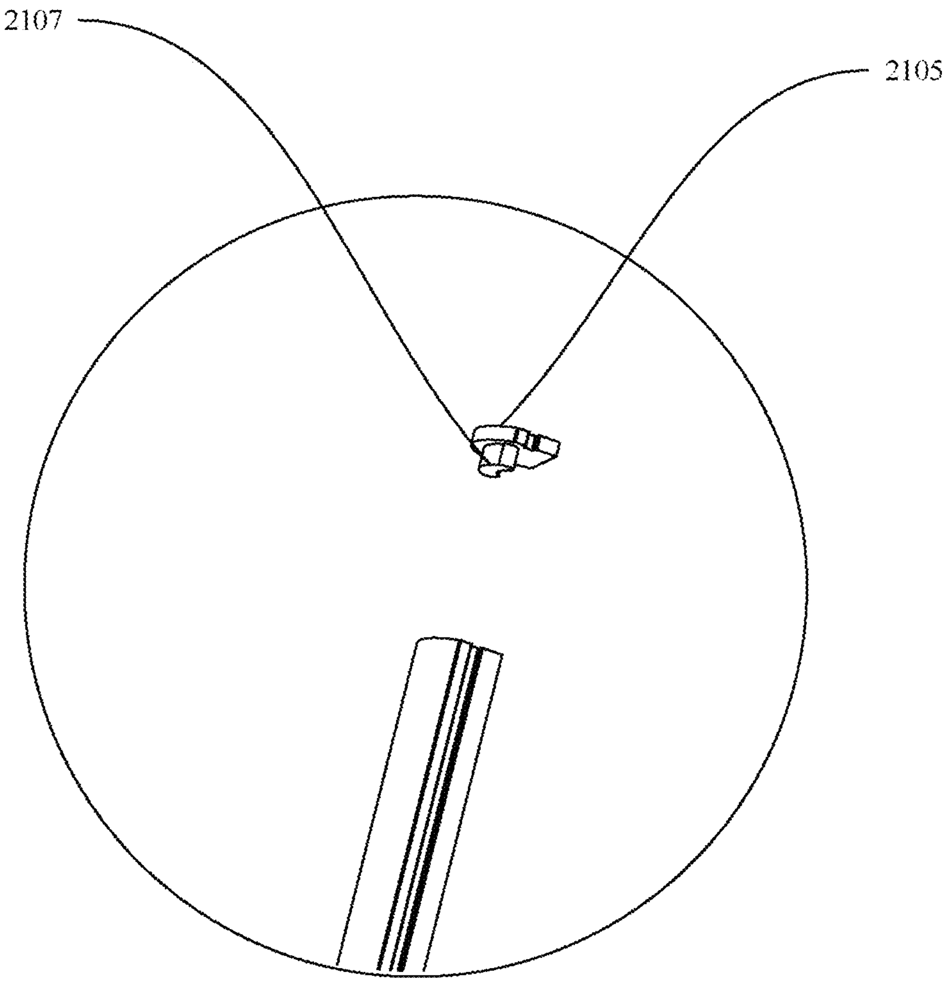
FIG. 7 is an enlarged view of an area C in FIG. 6.
Figure 8:
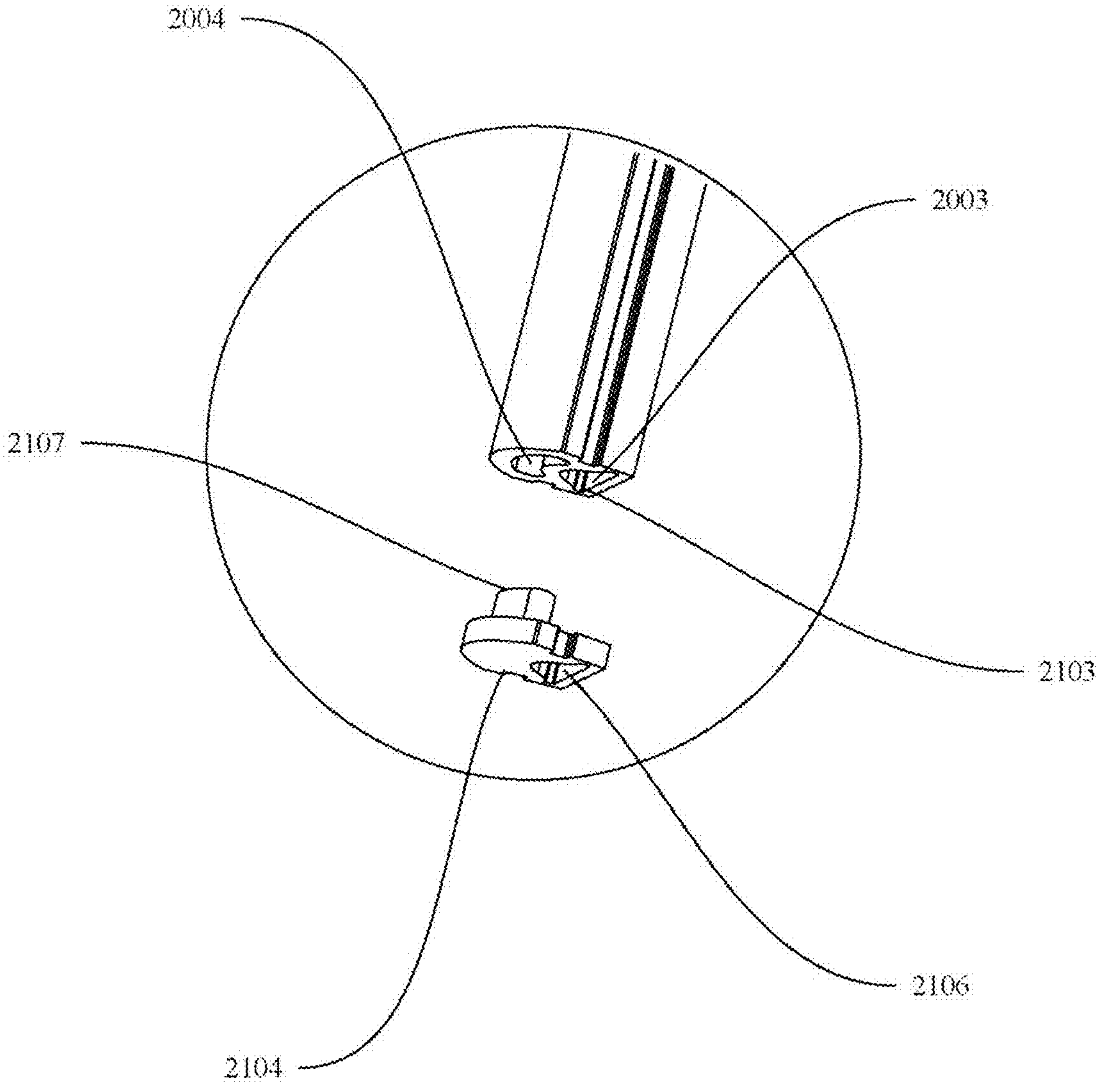
FIG. 8 is an enlarged view of an area D in FIG. 6.
Figure 9:
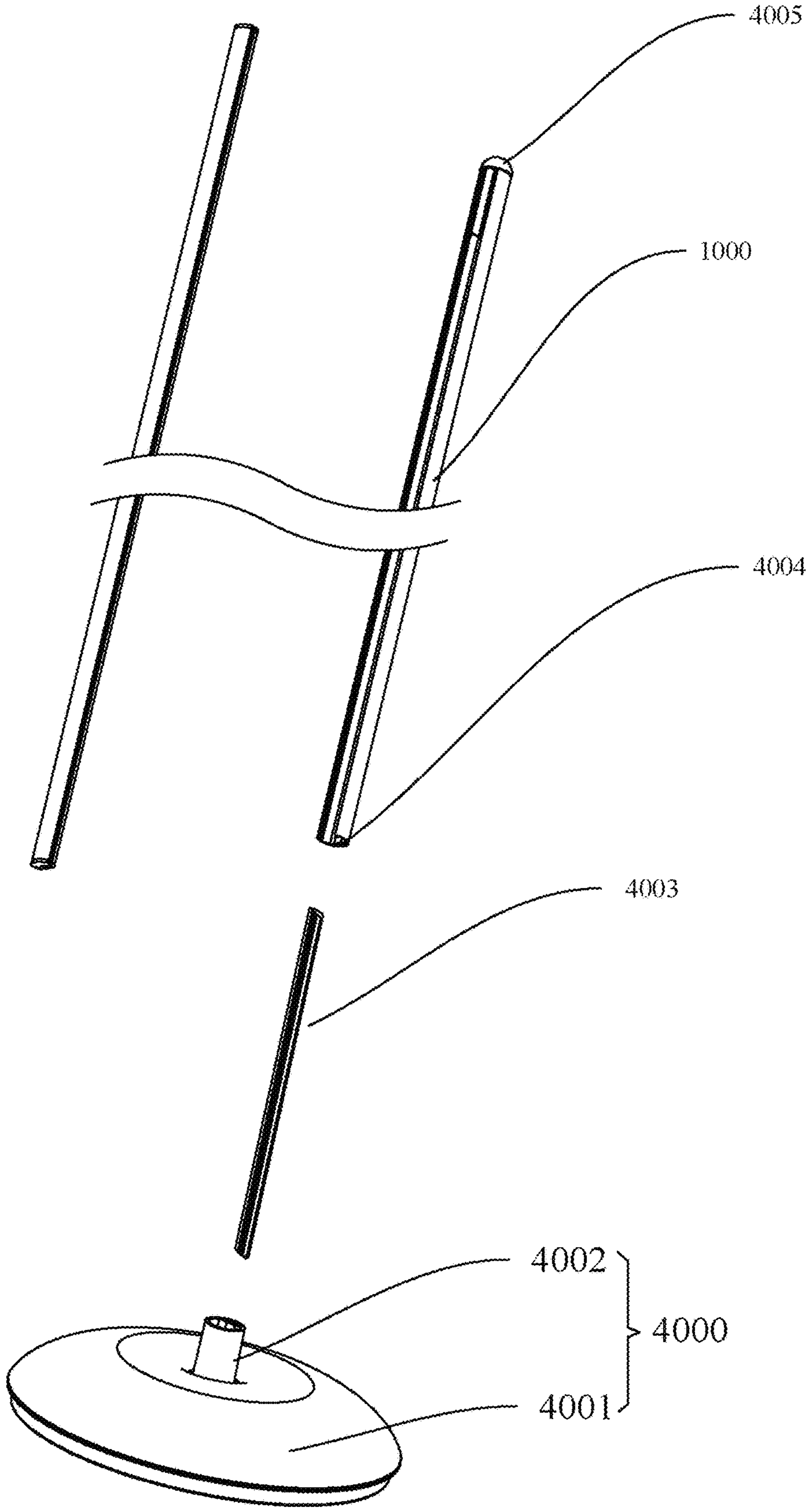
FIG. 9 is an exploded view showing the connection of a base and the supporting member.
Figure 10:
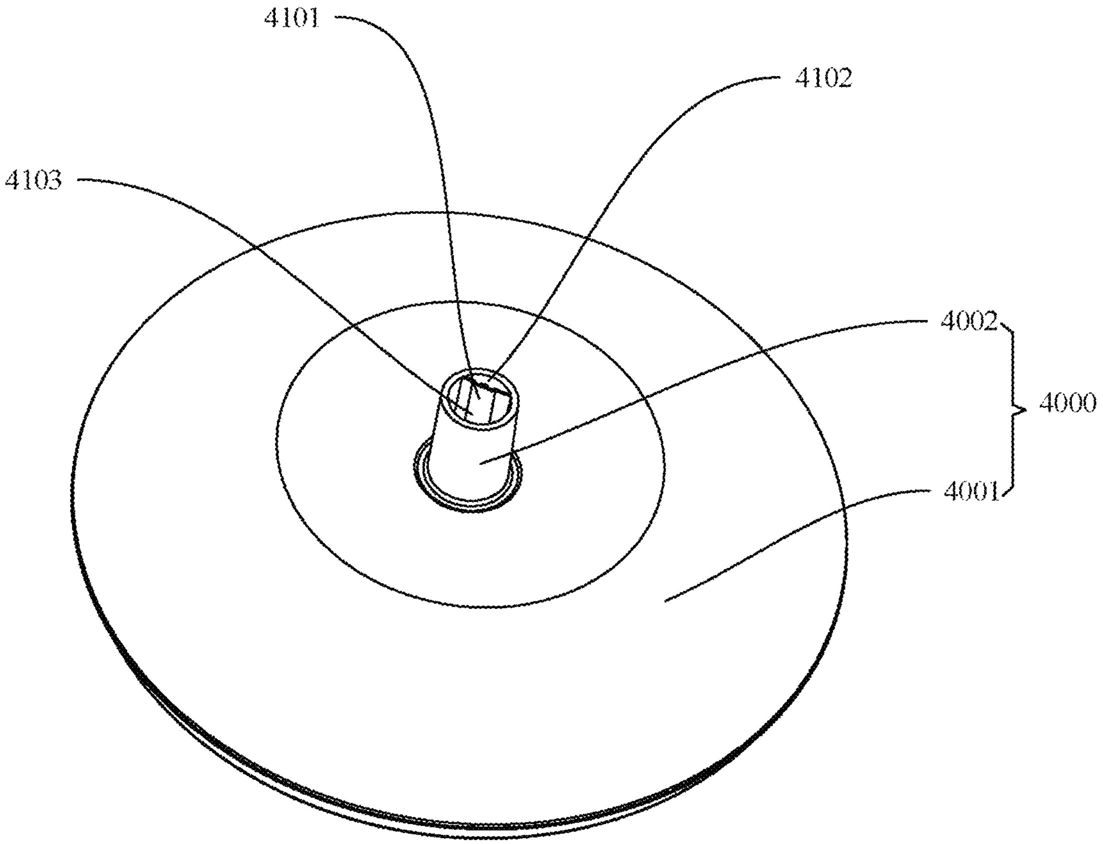
FIG. 10 is a structural diagram of the base.

Referring to FIG. 1-FIG. 10, the present disclosure provides a modular floor lamp 100. The modular floor lamp 100 includes a supporting member 1000 and a flexible light-emitting device 2000 detachably connected to the supporting member 1000. The flexible light-emitting device 2000 includes a light-transmitting lamp body 2001 and a light-emitting element 2002. The lamp body 2001 is provided with at least one mounting cavity 2003, and the light-emitting element 2002 is detachably arranged in the mounting cavity 2003. The lamp body 2001 is further provided with at least one cavity 2004, and the cavity 2004 is arranged parallel to the mounting cavity 2003. The light from the light-emitting element 2002 enters the cavity 2004 and is refracted and mixed. The supporting member 1000 and the flexible light-emitting device 2000 are detachably connected, so that users can freely assemble and detach them as needed. This enhances the flexibility and convenience of use and adapts to the requirements of different scenarios and environments. In addition, the light from the light-emitting element 2002 is refracted and mixed in the cavity 2004, thereby providing a more uniform and softer lighting effect. Therefore, this can effectively reduce light spots and shadows, so as to improve the quality of the light and visual comfort. Moreover, the cavity 2004 in the lamp body 2001 can reduce the weight of the lamp body 2001, so as to prevent the lamp body 2001 from falling off the supporting member 1000.

In the present embodiment, the supporting member 1000 includes at least one first supporting member 1001 and at least one second supporting member 1002. The modular floor lamp 100 further includes a first insertion column 3000. The first supporting member 1001 and the second supporting member 1002 are detachably connected via the first insertion column 3000.

Specifically, the first supporting member 1001 and the second supporting member 1002 each have a hollow cylindrical structure. In addition, the first supporting member 1001 and the second supporting member 1002 are provided with a first partition plate 1003 respectively. The first partition plate 1003 is configured for dividing an internal space of the first supporting member 1001 and an internal space of the second supporting member 1002 into a first accommodating space 1004 and a second accommodating space 1005 respectively. The lamp body 2001 is detachably mounted in the first accommodating space 1004, and an outer side wall of the lamp body 2001 abuts against an inner side wall of the first accommodating space 1004. Each of two ends of the second accommodating space 1005 is respectively provided with a first insertion hole 1101. The first insertion column 3000 is inserted into the first insertion hole 1101, so that the first supporting member 1001 and the second supporting member 1002 are detachably connected.

In the present embodiment, the first supporting member 1001 and the second supporting member 1002 are detachably connected via the first insertion column 3000, thereby enabling users to conveniently detach and assemble them as needed. Therefore, it is more flexible and convenient for installation, movement, or storage. Moreover, by arranging the first partition plate 1003, the internal accommodating space of the first supporting member 1001 and the second supporting member 1002 is fully utilized, thereby making the overall structure of the floor lamp more compact.

In the present embodiment, each of two ends of the first partition plate 1003 is provided with two fixing holes 1102 respectively, and a fastening member is arranged in the fixing hole 1102. When the first insertion column 3000 is inserted into the first insertion hole 1101, the fastening member abuts against the first insertion column 3000, so that the first insertion column 3000 is fixed in the first insertion hole 1101. Moreover, the fastening member may be any one or more of screws, pins, etc. By arranging the fixing hole 1102 and the fastening member, the accidental detachment or loosening of the first insertion column 3000 during the insertion process is effectively prevented, thereby enhancing the connection stability of the overall structure.

In the present embodiment, one side of the first partition plate 1003 facing the second accommodating space 1005 is provided with a first groove 1103 and a second groove 1104. One side of the first insertion column 3000 is provided with a first protruding rib 3001 and a second protruding rib 3002. When the first insertion column 3000 of the first supporting member 1001 is inserted into the first insertion hole 1101 of the second supporting member 1002, the first protruding rib 3001 is engaged with the first groove 1103, and the second protruding rib 3002 is engaged with the second groove 1104. By arranging the first groove 1103 and the second groove 1104, as well as the first protruding rib 3001 and the second protruding rib 3002, when the first insertion column 3000 of the first supporting member 1001 is inserted into the first insertion hole 1101 of the second supporting member 1002, the protruding ribs and the grooves are engaged with each other. Therefore, this effectively ensures the stable connection between the first supporting member 1001 and the second supporting member 1002, so as to avoid loosening or detachment during use.

In the present embodiment, the first supporting member 1001 and the second supporting member 1002 are each provided with a mounting opening 1006. In addition, the mounting opening 1006 is in communication with the first accommodating space 1004, so that the lamp body 2001 is detachably mounted in the first accommodating space 1004 through the mounting opening 1006.

Specifically, each of two side walls of the first accommodating space 1004 is provided with a mounting clip 1007 respectively, and each of two side walls of the lamp body 2001 is respectively provided with a mounting groove 2005 corresponding to the mounting clip 1007. The mounting clip 1007 is engaged in the mounting groove 2005, so that the lamp body 2001 is detachably connected to the first accommodating space 1004. The mounting clip 1007 is engaged with the mounting groove 2005 defined in the lamp body 2001, thereby enabling the installation and detachment of the lamp body 2001 to be more convenient and efficient. Moreover, the engagement between the mounting clip 1007 and the mounting groove 2005 provides a stable connection, thereby ensuring that the lamp body 2001 is firmly fixed in the first accommodating space 1004 after installation. Therefore, it is not prone to loosening or detachment, so as to enhance the stability and reliability of the overall structure.

In the present embodiment, the lamp body 2001 is a flexible light-transmitting hose. The light-emitting element 2002 includes a flexible light panel 2101 and a plurality of light beads 2102 electrically connected to the flexible light panel 2101. The light-emitting element 2002 is configured to bend along with the lamp body 2001 at any angle. The flexible light-transmitting hose can reduce the damage and wear caused by a fixed shape during use. This thereby extends the service life of the lamp and ensures the stability and durability during long-term use.

In the present embodiment, each of two ends of the lamp body 2001 is provided with an opening 2103 respectively, and the opening 2103 is in communication with the cavity 2004. In this way, the light-emitting element 2002 can be easily mounted and detached through these openings 2103. When it is necessary to replace or maintain the light-emitting element 2002, users can quickly complete the operation through the opening 2103 without the need for disassembling the entire device, which improves the convenience of use.

In the present embodiment, each of two ends of the lamp body 2001 is respectively provided with a first sealing cover 2104 and a second sealing cover 2105 for sealing the openings 2103. The first sealing cover 2104 and the second sealing cover 2105 can effectively seal the openings 2103 defined in both ends of the lamp body 2001. This can prevent dust and impurities from entering the interior of the lamp body 2001, so as to protect the light-emitting element 2002 and its internal structure and to extend the service life of the device. The first sealing cover 2104 is provided with a through hole 2106, and the through hole 2106 is in communication with the mounting cavity 2003. In this way, the light-emitting element 2002 is detachably mounted in the mounting cavity 2003. In addition, the light-emitting element 2002 extends outwards from the through hole 2106 to be electrically connected to an external power source.

In the present embodiment, the first sealing cover 2104 and the second sealing cover 2105 are each provided with a sealing column 2107, and the sealing column 2107 is mounted in the cavity 2004 to seal the cavity 2004. Therefore, this can prevent dust, moisture and other impurities from entering the interior of the lamp body 2001, thereby avoiding the impact of the external environment on the light-emitting element 2002 and the internal circuits. Moreover, this can reduce electrical faults and safety hazards caused by external factors, which enhances the safety of use.

In the present embodiment, a thickness of an outer side wall of the mounting cavity 2003 is in a range from 0.1 mm to 100 mm, and a thickness of an outer side wall of the cavity is in a range from 0.2 mm to 120 mm. The cavity 2004 has a relatively large accommodating space, which enables the light to be fully refracted and mixed within the cavity 2004, so as to provide a more uniform and softer lighting effect. Moreover, since the outer side wall of the cavity 2004 has an arc-shaped structure, it can make the light have a multi-angle divergence effect.

In another embodiment of the present disclosure, the floor lamp 100 further includes a base 4000, and the base 4000 is detachably connected to the supporting member 1000. The flexible light-emitting device 2000 is detachably connected to the supporting member 1000 and is electrically connected to the base 4000. The detachable connection between the base 4000 and the supporting member 1000 enables users to conveniently install and detach the floor lamp.

In the present embodiment, the base 4000 includes a mounting base plate 4001, and a central connecting column 4002 is arranged on the mounting base plate 4001. The central connecting column 4002 is detachably connected to the supporting member 1000 via a second insertion column 4003. Specifically, each of two ends of the supporting member 1000 is provided with a second insertion hole 4004 respectively. The second insertion column 4003 is inserted into the second insertion hole 4004 positioned at a bottom end of the support member 1000, so that the base 4000 and the supporting member 1000 are detachably connected. The central connecting column 4002 is connected to the supporting member 1000 via the second insertion column 4003. This connection makes the connection between the base 4000 and the supporting member 1000 more stable, prevents loosening or falling off during use, and enhances the stability and reliability of the overall structure.

In the present embodiment, the central connecting column 4002 has a hollow cylindrical structure, and a second partition plate 4101 is arranged inside the central connecting column 4002. The second partition plate 4101 is configured for dividing an internal space of the central connecting column 4002 into a third accommodating space 4102 and a fourth accommodating space 4103. The second insertion column 4003 is arranged in the third accommodating space 4102, and the second insertion column 4003 abuts against an inner wall surface of the third accommodating space 4102. The flexible light-emitting device 2000 is detachably mounted in the supporting member 1000 and extends into the fourth accommodating space 4103. In addition, the light-emitting device 2000 is electrically connected to the base 4000. The design of the hollow cylindrical structure and the second partition plate 4101 enables the internal space to be fully utilized. The third accommodating space 4102 and the fourth accommodating space 4103 can respectively accommodate different components. This optimizes the internal layout, reduces space waste, and enhances the compactness and functionality of the device.

In the present embodiment, a cover plate 4005 for sealing the supporting member 1000 is arranged on a top end of the supporting member 1000. This design can effectively seal the supporting member 1000, and prevent dust, moisture and other impurities from entering the interior of the supporting member 1000. Therefore, this can protect the internal components, extend the service life of the device, and also can improve the appearance of the device.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

The invention claimed is:

1. A modular floor lamp, comprising:

a supporting member, and a light-emitting device connected to the supporting member;

wherein the supporting member comprises at least one first supporting member and at least one second supporting member, the modular floor lamp further comprises a first insertion column, and the at least one first supporting member and the at least one second supporting member are detachably connected via the first insertion column;

wherein the at least one first supporting member and the at least one second supporting member respectively have a hollow cylindrical structure, the at least one first supporting member and the at least one second supporting member are respectively provided with a first partition plate, the first partition plate is configured for dividing an internal space of the at least one first supporting member and an internal space of the at least one second supporting member into a first accommodating space and a second accommodating space respectively, the light-emitting device is detachably mounted in the first accommodating space, and an outer side wall of the light-emitting device is configured for abutting against an inner side wall of the first accommodating space;

wherein each of two ends of the second accommodating space is respectively provided with a first insertion hole, and the first insertion column is inserted into the first insertion hole, so that the at least one first supporting member and the at least one second supporting member are detachably connected;

wherein each of two ends of the first partition plate is respectively provided with at least one fixing hole, and a fastening member is arranged in the at least one fixing hole; when the first insertion column is inserted into the first insertion hole, the fastening member is configured for abutting against the first insertion column, so that the first insertion column is fixed in the first insertion hole;

wherein one side of the first partition plate facing the second accommodating space is provided with a first groove and a second groove, and one side of the first insertion column is provided with a first protruding rib and a second protruding rib: when the first insertion column of the at least one first supporting member is inserted into the first insertion hole of the at least one second supporting member, the first protruding rib is engaged with the first groove, and the second protruding rib is engaged with the second groove.

2. The modular floor lamp according to claim 1, wherein the at least one first supporting member and the at least one second supporting member are respectively provided with a mounting opening, and the mounting opening is in communication with the first accommodating space, so that the light-emitting device is detachably mounted in the first accommodating space through the mounting opening.

3. The modular floor lamp according to claim 1, wherein the light-emitting device is a flexible light-emitting device, the flexible light-emitting device comprises a light-transmitting lamp body and a light-emitting element, the lamp body is provided with at least one mounting cavity, and the light-emitting element is detachably arranged in the at least one mounting cavity, the lamp body is further provided with at least one cavity, the at least one cavity is arranged parallel to the at least one mounting cavity, and the light from the light-emitting element enters the at least one cavity and is refracted and mixed in the cavity.

4. A modular floor lamp, comprising:

a supporting member, and a light-emitting device connected to the supporting member;

wherein the supporting member comprises at least one first supporting member and at least one second supporting member, the modular floor lamp further comprises a first insertion column, and the at least one first supporting member and the at least one second supporting member are detachably connected via the first insertion column;

wherein the at least one first supporting member and the at least one second supporting member respectively have a hollow cylindrical structure, the at least one first supporting member and the at least one second supporting member are respectively provided with a first partition plate, the first partition plate is configured for dividing an internal space of the at least one first supporting member and an internal space of the at least one second supporting member into a first accommodating space and a second accommodating space respectively, the light-emitting device is detachably mounted in the first accommodating space, and an outer side wall of the light-emitting device is configured for abutting against an inner side wall of the first accommodating space;

wherein the light-emitting device is a flexible light-emitting device, the flexible light-emitting device comprises a light-transmitting lamp body and a light-emitting element, the lamp body is provided with at least one mounting cavity, and the light-emitting element is detachably arranged in the at least one mounting cavity, the lamp body is further provided with at least one cavity, the at least one cavity is arranged parallel to the at least one mounting cavity, and the light from the light-emitting element enters the at least one cavity and is refracted and mixed in the cavity;

wherein each of two side walls of the first accommodating space is provided with a mounting clip respectively, each of two side walls of the lamp body is respectively provided with a mounting groove corresponding to the mounting clip, and the mounting clip is engaged in the mounting groove, so that the lamp body is detachably connected to the first accommodating space.

5. The modular floor lamp according to claim 3, wherein the lamp body is a flexible light-transmitting hose, the light-emitting element comprises a flexible light panel and a plurality of light beads electrically connected to the flexible light panel, and the light-emitting element is configured to bend along with the lamp body at any angle.

6. The modular floor lamp according to claim 3, wherein each of two ends of the lamp body is provided with an opening respectively, and the opening is in communication with the at least one cavity, so that the light-emitting element is detachably mounted in the at least one mounting cavity through the opening.

7. A modular floor lamp, comprising:

a supporting member, and a light-emitting device connected to the supporting member;

wherein the supporting member comprises at least one first supporting member and at least one second supporting member, the modular floor lamp further comprises a first insertion column, and the at least one first supporting member and the at least one second supporting member are detachably connected via the first insertion column;

wherein the at least one first supporting member and the at least one second supporting member respectively have a hollow cylindrical structure, the at least one first supporting member and the at least one second supporting member are respectively provided with a first partition plate, the first partition plate is configured for dividing an internal space of the at least one first supporting member and an internal space of the at least one second supporting member into a first accommodating space and a second accommodating space respectively, the light-emitting device is detachably mounted in the first accommodating space, and an outer side wall of the light-emitting device is configured for abutting against an inner side wall of the first accommodating space;

wherein the light-emitting device is a flexible light-emitting device, the flexible light-emitting device comprises a light-transmitting lamp body and a light-emitting element, the lamp body is provided with at least one mounting cavity, and the light-emitting element is detachably arranged in the at least one mounting cavity, the lamp body is further provided with at least one cavity, the at least one cavity is arranged parallel to the at least one mounting cavity, and the light from the light-emitting element enters the at least one cavity and is refracted and mixed in the cavity;

wherein each of two ends of the lamp body is provided with an opening respectively, and the opening is in communication with the at least one cavity, so that the light-emitting element is detachably mounted in the at least one mounting cavity through the opening;

wherein a first sealing cover and a second sealing cover for sealing the openings are respectively arranged on both ends of the lamp body, the first sealing cover is provided with a through hole, and the through hole is in communication with the at least one mounting cavity, so that the light-emitting element is detachably mounted in the at least one mounting cavity, and the light-emitting element extends outwards from the through hole to be electrically connected to an external power source.

8. The modular floor lamp according to claim 7, wherein the first sealing cover and the second sealing cover are each provided with a sealing column, and the sealing column is mounted in the at least one cavity to seal the cavity.

9. The modular floor lamp according to claim 8, wherein the at least one cavity is positioned at an outer side of the at least one mounting cavity, and an outer side wall of the at least one cavity has an arc-shaped structure, so that the light from the light-emitting element enters the at least one cavity to be refracted and mixed and then diverges outwards.

10. The modular floor lamp according to claim 9, wherein a thickness of an outer side wall of the at least one mounting cavity is in a range from 0.1 mm to 100 mm, a thickness of an outer side wall of the at least one cavity is in a range from 0.2 mm to 120 mm, and an accommodating space of the at least one cavity is greater than that of the at least one mounting cavity, so that the light is able to be fully refracted and mixed in the at least one cavity.

11. The modular floor lamp according to claim 1, further comprising a base, wherein the base is detachably connected to the supporting member, the light-emitting device is detachably connected to the supporting member, and the light-emitting device is electrically connected to the base.

12. The modular floor lamp according to claim 11, wherein the base comprises a mounting base plate, a central connecting column is arranged on the mounting base plate, and the central connecting column is detachably connected to the supporting member via a second insertion column.

13. The modular floor lamp according to claim 12, wherein each of two ends of the supporting member is respectively provided with a second insertion hole, and the second insertion column is inserted into the second insertion hole, so that the base is detachably connected to the supporting member.

14. The modular floor lamp according to claim 13, wherein the central connecting column has a hollow cylindrical structure, a second partition plate is arranged inside the central connecting column, the second partition plate is configured for dividing an internal space of the central connecting column into a third accommodating space and a fourth accommodating space, the second insertion column is arranged in the third accommodating space, and the second insertion column is configured for abutting against an inner wall surface of the third accommodating space.

15. The modular floor lamp according to claim 14, wherein the light-emitting device is detachably mounted in the supporting member and extends into the fourth accommodating space, and the light-emitting device is electrically connected to the base.

16. The modular floor lamp according to claim 15, wherein a top end of the supporting member is provided with a cover plate configured for sealing the supporting member.

* * * * *